United States Patent [19]

Theisen et al.

[11] Patent Number: 5,501,791
[45] Date of Patent: Mar. 26, 1996

[54] PRESSURE ISOLATION VALVE AND BYPASS VALVE; AND FILTER HEAD ASSEMBLY INCORPORATING SAME

[75] Inventors: Jeffrey J. Theisen, Prior Lake; John F. Connelly, Chanhassen, both of Minn.

[73] Assignee: Donaldson Company, Inc., Minneapolis, Minn.

[21] Appl. No.: 327,888

[22] Filed: Oct. 24, 1994

Related U.S. Application Data

[63] Continuation of Ser. No. 128,045, Sep. 28, 1993, abandoned, which is a continuation of Ser. No. 848,271, Mar. 9, 1992, abandoned.

[51] Int. Cl.⁶ .................... B01D 35/143; B01D 35/147
[52] U.S. Cl. .................... 210/90; 210/133; 210/340
[58] Field of Search .................... 210/90, 130–133, 210/340; 137/102, 115, 557

[56] References Cited

U.S. PATENT DOCUMENTS

| | | | |
|---|---|---|---|
| 3,474,906 | 10/1969 | Tennis | 210/130 |
| 3,819,052 | 6/1974 | Firth | 210/90 |
| 3,827,558 | 8/1974 | Firth | 210/90 |
| 3,847,819 | 11/1974 | Firth | 210/444 |
| 4,369,113 | 1/1983 | Stifelman | 210/440 |
| 4,428,834 | 1/1984 | McBroom et al. | 210/131 |
| 4,480,160 | 10/1984 | Stifelman | 200/82 R |
| 4,512,882 | 4/1985 | Fischer et al. | 210/86 |
| 4,522,712 | 6/1985 | Fischer et al. | 210/86 |
| 4,615,800 | 10/1986 | Stifelman et al. | 210/132 |
| 4,717,472 | 1/1988 | Oberg | 210/132 |
| 4,883,083 | 11/1989 | Fisher et al. | 137/110 |

Primary Examiner—Matthew O. Savage
Attorney, Agent, or Firm—Merchant, Gould, Smith, Edell, Welter & Schmidt

[57] ABSTRACT

A filter head adapted for use with spin-on filters is shown. The filter head carries a spring load piston which is normally biased to close a filter bypass channel. A fluid pressure increase caused by a clogged filter causes the piston to move opening the bypass and at the same time opening a signal channel between a source of fluid pressure and a signal outlet.

2 Claims, 3 Drawing Sheets

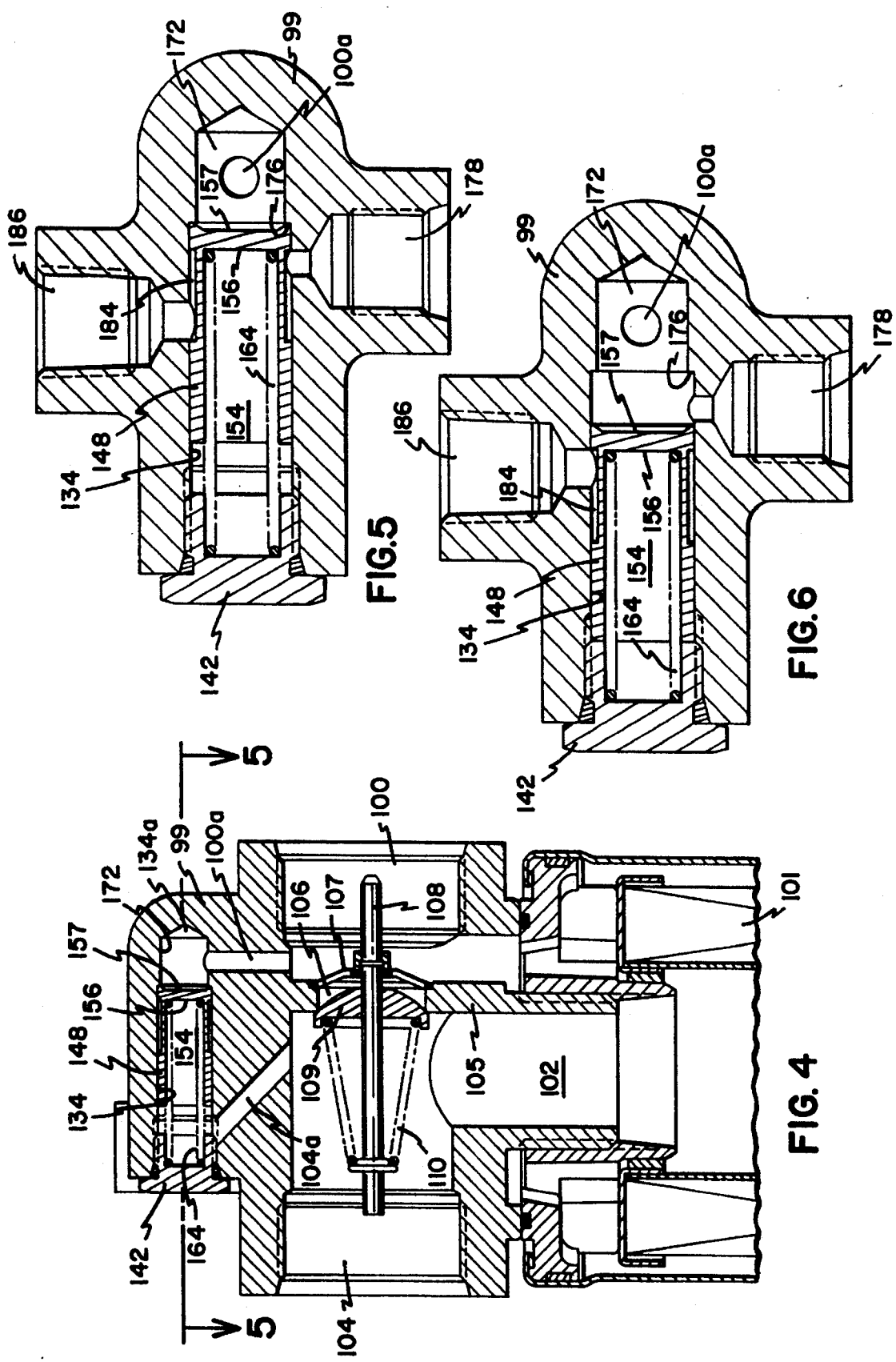

PRESSURE ISOLATION VALVE AND BYPASS VALVE; AND FILTER HEAD ASSEMBLY INCORPORATING SAME

This is a continuation of application Ser. No. 08/128,045, filed Sep. 28, 1993 now abandoned, which was a continuation of Ser. No, 07/848,271, filed Mar. 9, 1992, now abandoned.

TECHNICAL FIELD

The present invention relates generally to filter heads and valve assemblies for use with fluid filters. The invention concerns a pressure isolation and bypass valve for such systems and more specifically concerns filter heads adapted for use with spin-on filters wherein the filter head includes a pressure isolation and bypass valve.

BACKGROUND OF THE INVENTION

Fluid filters are commonly used in a variety of applications, including hydraulic systems, fuel systems and lubrication systems. Such filters generally include a filter element enclosed within a housing and mounted on a filter head. The filter head is usually incorporated into a fluid line of the flow system. Thus, the fluid head generally includes an inlet port, whereby fluid flow is received and directed into the filter or filter assembly. The filter head also generally includes outlet means by which fluid is received from the filter assembly, following filtration, and is directed back into a fluid flow-line.

Frequently used filter or filter assemblies are of the spin-on type, such as the one described in U.S. Pat. No. 4,369,113, incorporated herein by reference. The filter head assembly of the present invention is particularly adapted for use with such spin-on filters; however the principles may be employed with other types of filter systems.

Generally, such filter assemblies provide for the removal of undesired particles from a fluid line. Eventually, the filter elements of such assemblies may become clogged, prohibiting substantial fluid flow across the filter element. When such condition occurs, pressure on the upstream side of the filter assembly, relative to the downstream side, may become substantial. Also, the volume of fluid flow from the outlet end would become reduced and quite possibly could be entirely stopped.

The above type of blockages in fluid flow lines can pose numerous problems. For example, should fluid flow outward from the filter head at an appropriate rate substantially stop, then machinery located downstream may become damaged. Further, the increased pressure on the upstream side of the filter may result in rupturing of fluid seals, or damage to machinery located upstream of the filter. Also, should the upstream pressure become great enough, the filter itself may rupture or collapse, possibly resulting in a release of undesired matter from the filter, which can damage downstream equipment or occlude fluid lines.

To alleviate some of the above-described problems, a filter system may include a bypass line, operated by means of a relief valve, to permit fluid flow to selectively circumvent the filter in response to substantial occluding or plugging of the filter assembly. While numerous arrangements are possible, generally such bypass lines are of two basic types. In the first, when substantial plugging of the filter occurs, the relief valve permits fluid flow to merely circumvent the filter, and lead back into the main fluid line. For this type of arrangement, the fluid flowing into the downstream machinery will not have been filtered; however, at least downstream machinery will be protected from loss of substantial fluid pressure.

For the other type of arrangement, generally the relief valve operates to permit fluid flow into a line which is directed back to a fluid reservoir or elsewhere. While downstream equipment may not be protected under such circumstances, at least the filter assembly and any upstream equipment are protected from substantial increases in pressure. Also, such an arrangement may be useful when downstream machinery can tolerate a reduction in fluid flow, but not unfiltered fluid.

Conventional relief valves may be of numerous types. Generally, a differential valve may be used to sense the pressure differential between the upstream and the downstream sides of the filter. Should the pressure of the upstream side relative to the downstream side become sufficiently great, such a valve would open, permitting a circumventing flow of either of the two types described above. This type of valve generally includes a valve member therein which receives upstream and downstream pressure against opposite ends or sides thereof. Should the pressure of the upstream side increase relative to the downstream side, such a valve member will move within the valve body, generally opening a flow passageway for fluid to escape through an auxiliary or outlet line.

Generally, for conventional arrangements, the valve body defines a longitudinal chamber in which the piston member is slidably retained. The longitudinal chamber has a first end in communication with an upstream side of the filter assembly, and a second end in communication with the downstream side of the filter assembly. The valve member, again, is positioned between the two inlet ends of the valve chamber, and is slidable therebetween.

Conventional relief valves are generally designed to include a mechanical or electrical indicator to produce an output signal, either visually or electrically, that the filter element is plugged.

In addition to relief valves, conventional filter designs also include a separate integrated device for fluid bypass. The differential pressure relief valve opens to prevent damage to the system from excess differential pressure.

As indicated previously, generally the filter assembly is attached to a filter head by conventional means such as those described in U.S. Pat. No. 4,369,113. Such filter heads are preferably die-cast as a single unit, with appropriate lateral bores or holes drilled therein following the casting, to provide for attachment to a fluid line and to filter means. It would be preferred that a relief valve body and bypass valve be capable of being cast directly into the filter head at the time of the filter head assembly; for convenience, for reduction of expense; and for efficiency of operation without substantiated risk of leakage. However, previous filter heads have not generally provided for this, especially in arrangements wherein the valve body has means correcting for the problems described above.

Generally, what has been needed has been a relief valve assembly that produces a discreet signal that a filter has become clogged and that the discreet signal will meet the requirements for use in microprocessor controlled systems. This necessitates isolation of a pressure to actuate the switch, controlled by the differential pressure across the filtering medium and independent of fluctuations in system pressure. Also, what is needed is a device which incorporates the pressure isolation and fluid bypass into one device. As will be seen, the instant invention includes such means, and other advantageous improvements.

SUMMARY OF THE INVENTION

The present invention is directed towards a relief valve assembly that isolates a pressure to produce a discreet signal that a filter has become clogged. Also, the invention is directed towards a device which incorporates the pressure isolation and fluid bypass into one device.

A relief valve assembly is provided for permitting fluid flow to circumvent an occluded filter in a fluid line such as a lubricating line, a fuel line, or an hydraulic line. The relief valve assembly includes a valve body defining an internal longitudinal chamber having a first inlet, a second inlet, and a lateral takeoff aperture. In use, the valve body is typically oriented with the first inlet receiving fluid flow from flow-communication with an upstream side of a cooperating filter assembly; and the second fluid inlet operatively engaging a downstream side of the filter assembly. Thus, the valve body is preferably oriented for sensing differential pressures between upstream and downstream sides of the associated filter assembly.

These advantages and other features of this invention are further explained and may be better understood by reference to the drawings which form a further part of this disclosure and to the description matter thereafter wherein two alternate embodiments are discussed in detail.

BRIEF DESCRIPTION OF THE DRAWINGS

FIG. 4 is a fragmentary cross-sectional view of a commercially available, and presently preferred embodiment of a filter head assembly incorporating separate pressure isolation and bypass valves, according to the present invention; both valves being shown in closed position.

FIG. 5 is an enlarged cross-sectional view of the pressure isolation valve taken along line 5—5 of FIG. 4, showing the valve in closed position.

FIG. 6 is a view similar to FIG. 5 showing the valve in open position.

DETAILED DESCRIPTION OF PREFERRED AND ALTERNATE EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed structure.

Figures 1, 2:
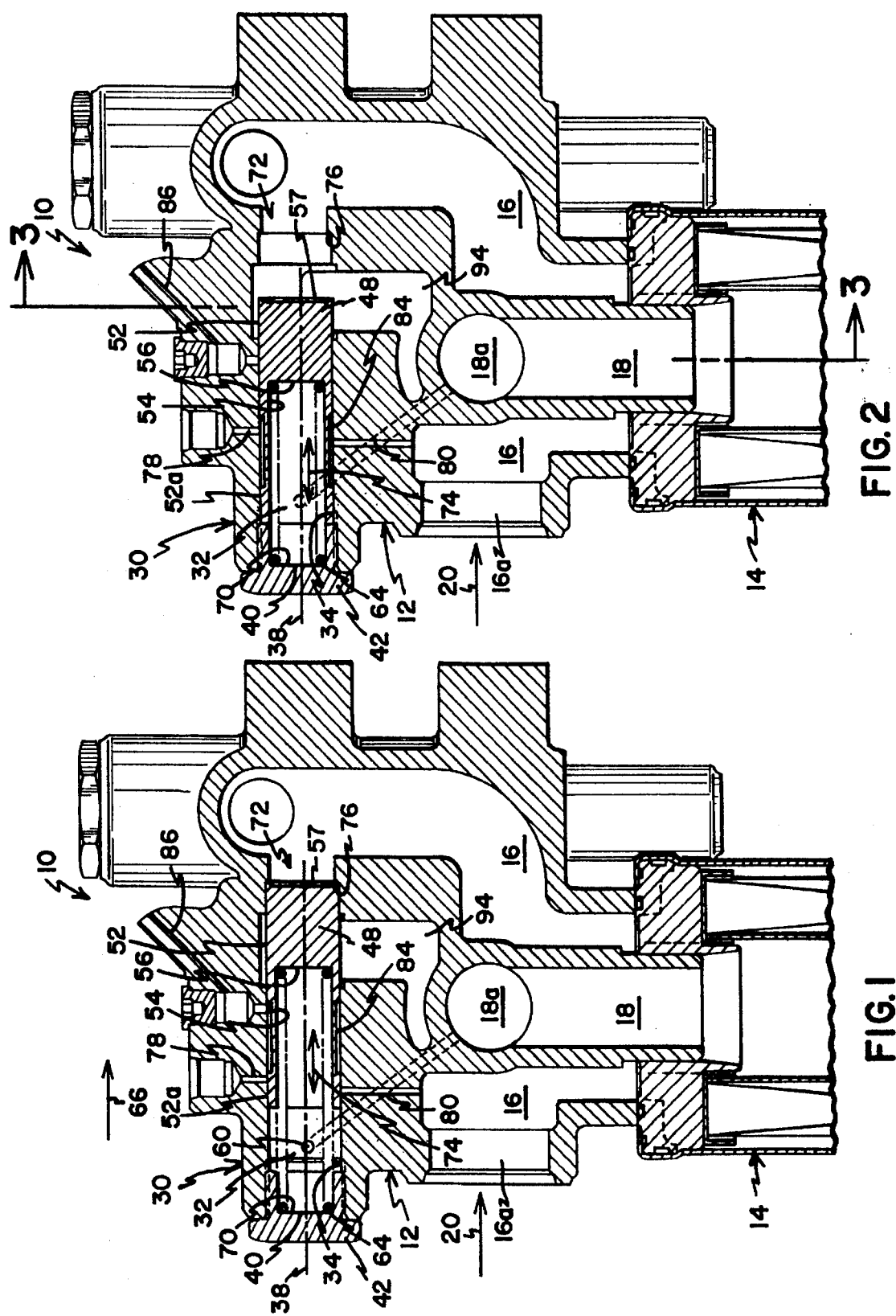
FIG. 1 is a fragmentary cross-sectional view of a filter head assembly incorporating a combined pressure isolation valve/bypass valve assembly therein, according to the present invention; the valve being shown in a closed position; and the filter head assembly being shown with a spin-on type filter mounted thereon for cooperative engagement.
FIG. 2 is a fragmentary cross-sectional view of the filter head assembly according to FIG. 1, shown with the valve in an open position; and with a spin-on type filter attached thereto.

Reference numeral 10, FIG. 1, generally designates a filter head assembly according to the present invention. In FIG. 1 filter head assembly 10 is shown comprising a head block 12 shown with a spin-on type filter 14 mounted thereon for operation. While the instant invention is described with respect to a spin-on type filter 14, it will be understood that a variety of filter designs may be used. Referring to FIGS. 1–2, generally head block 12 includes an upstream fluid passageway 16 and a downstream fluid passageway 18. In typical operation, head block 12 will be positioned in a fluid line so as to receive fluid from the direction of arrows 20, FIGS. 1–2, directing same by an inlet port 16a and passageway 16 to the area surrounding filter 14, from which it passes through filter 14 to the center thereof. Following fluid filtration within the filter 14, conduit means directs the fluid from the center of filter 14 into block 12 through a downstream fluid passage 18 leading to an outlet port 18a, and in typical use the fluid is ejected from the head block 12 by means of the downstream fluid passage 18.

Filter head assembly 12 according to the present invention includes a pressure isolation and bypass valve assembly 30, FIGS. 1 and 2, therein. Pressure isolation and bypass valve assembly 30 comprises a valve body 32 defining an internal longitudinal channel 34. Longitudinal channel 34 is a chamber, has a central longitudinal axis 38 and is preferably cylindrical, with a circular cross-section. One end 40 of the channel 34 is openable, having plug 42 threadably received therein. It is through end 40 that internal mechanisms of valve assembly 30 may be inserted during assembly.

Valve assembly 30 operates by means of selected movement of the valve piston member 48. The preferred piston member 48 is cylindrically-shaped and is slidably received within the channel or chamber 34. Piston member 48 includes an outer side-wall 52, an internal bore 54 having an opened end and having a closed end defining a first pressure-receiving face 56. Face 56 receives fluid pressure, during operation of the assembly 30, directed thereagainst by means of a first fluid inlet 60 of valve body 32. Inlet 60 opens into a channel (shown in phantom in FIG. 1) extending between downstream fluid passageway 18 and chamber 34.

A sealing engagement is selectively provided by means including biasing member 64 which, in FIG. 1, generally biases piston member 48 in the direction of arrow 66. The preferred biasing means 64 of the instant embodiment comprises a coiled spring, which extends between face 56 and a second pressure receiving face 70 defined in part by an internal face of plug 42.

Piston member 48 is operably positioned within channel 34 between first fluid inlet 60 and a second fluid inlet 72. Piston member 48 is slidable along axis 38 in the general directions of movements indicated by double-headed arrow 74.

For the embodiment of FIGS. 1 and 2, piston member 48 is selectively movable with respect to differential pressure between the first and second inlets 60 and 72, respectively. Preferably, piston member 48 is shaped such that the entire pressure-receiving surface area presented to fluid pressure from the first inlet 60 at face 56 is substantially equal to the entire pressure-receiving area 57 presented to the second inlet 72. Thus, should the pressure from the two inlets, per unit area, be the same, piston member 48 will not move. Under such conditions, biasing means 64 would operate to keep the valve assembly 30 closed, by seating piston member 48 against an annular seat 76 around inlet 72.

Pressure valve assembly 30 includes a signal outlet port 78 which produces a pressure when filter element 14 is clogged. Pressure valve assembly 30 has a signal channel 80 for fluidly connecting upstream fluid passageway 16 with signal outlet 78 when piston member 48 is in the open position. The outer side-wall 52 of piston member 48 includes an elongated recessed portion 84 defining an annular chamber between piston member 48 and the wall of channel 34 that aligns with the channel 80 and port 78 when the piston is displaced to the open position shown in FIG. 2.

Generally, when pressure isolation and bypass valve assembly 30 is said to be "closed" the filter head assembly 10 is such that fluid flow into the upstream passageway 16 is only permitted to leave the block 12 by flow through the filter 14 and outward through the downstream fluid passageway 18. Thus, the system, when the pressure isolation and bypass valve 30 is closed, as shown in FIG. 1, is oriented for normal operation in filtering fluid.

On the other hand, when the pressure isolation valve assembly 30 is said to be "open," as shown in FIG. 2, it is generally meant that in response to substantial occlusion within filter 14, the pressure isolation valve has opened, permitted fluid flow from the assembly without passage through filtering elements of the filter 14; the flow bypassing the filter by leaving block 12 through second inlet 72 and downstream passageway 18.

Figure 3:
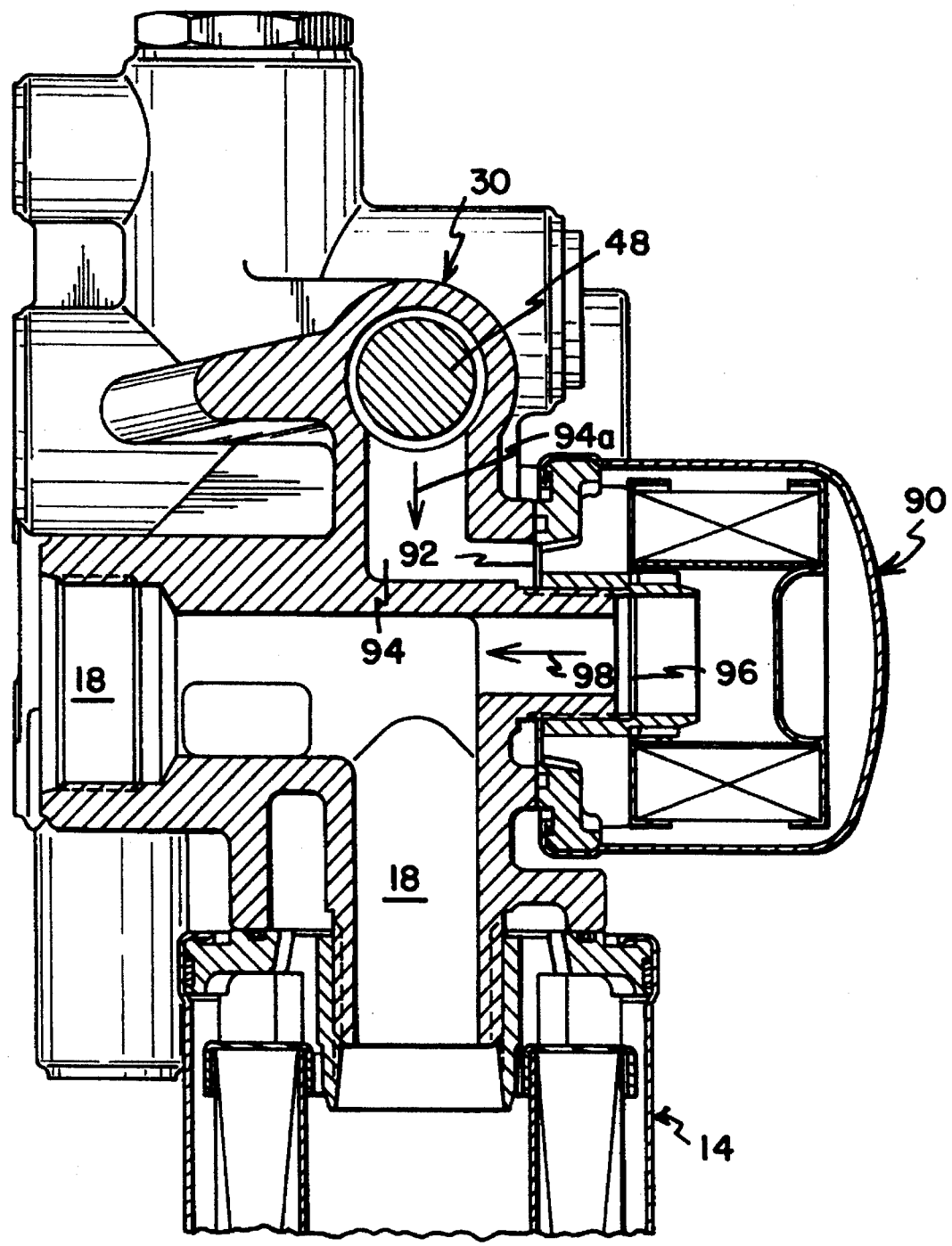
FIG. 3 is a fragmentary cross-sectional view taken generally along line 3—3 of FIG. 2; the bypass filter being shown.

The above-described general operation will be understood in more detail by reference to FIG. 3 as well as FIGS. 1 and 2. Pressure isolation valve 30 emits a pressure signal to a separate pressure switch, not shown, when the pressure difference across the valve reaches or exceeds a predetermined value, wherein the pressure in second inlet 72 exceeds the pressure in inlet 60 plus the spring force applied against face 56, causing piston member 48 to move to the open position shown in FIG. 2. Under normal conditions, when the pressure valve assembly 30 is in the closed position, the difference between the pressures of the upstream and downstream passageways 16 and 18 is below a certain predetermined point. During this time, a full diameter end portion 52 of piston member 48 covers and closes both signal channel 80 and port 78, consequently signal outlet 78 does not produce a signal.

Eventually, the filter elements of the assembly 14 may become clogged, prohibiting substantial fluid flow across the filter element. When such condition occurs, pressure on the upstream side 16 of filter assembly 14, relative to the downstream side 18, may become substantial. Also, the volume of fluid flow from the downstream side 18 would become reduced and quite possibly could be entirely stopped.

When the difference between the pressures in the upstream and downstream passageways 16 and 18 equals or exceeds the predetermined value, the valve assembly moves to the open position as shown in FIG. 2. Signal channel 80 then opens into annular chamber 84 of piston 48. Fluid from upstream passageway 16 then flows from signal channel 80 through annular region 84 in the piston which is also aligned with signal outlet 78. Fluid entering signal outlet 78 produces a discreet signal that filter 14 has become clogged, which can be detected by a pressure switch connected to signal outlet 78, not shown.

Referring to FIGS. 1 and 2, pressure isolation valve assembly 30 includes a lateral outlet aperture 86 or takeoff aperture positioned substantially laterally with respect to the longitudinal axis 38 of valve body 32, permitting fluid flow therethrough. Generally, outer side-wall 52 of piston member 48 will be, in diameter, only slightly smaller than the inside diameter of internal longitudinal channel 34. Preferably, the diameter of side portion 52 will be sufficiently smaller than channel 34 to permit sliding engagement or slip fit. As a result of the slip fit, a small amount of fluid under pressure from signal channel 80 or from channel 34 may flow around the outside of piston member 48 between the piston member 48 and the wall of channel 34 until it leaks into annular chamber 84 and out through outlet aperture 86. This prevents pressure from building up in signal outlet 78 when the piston member is closed.

Referring specifically to FIG. 3., after filter 14 becomes clogged and pressure isolation valve 30 is in the open position, oil in upstream passageway 16 is allowed by open piston member 48 to bypass occluded filter 14 and enter the filtering medium of a bypass filter 90, shown in FIG. 3. The oil enters bypass filter 90 through passageway 94 at inlet port 92 from the direction of arrow 94a. Following filtration within bypass filter 90, the oil leaves filter 90 through outlet port 96 in the direction of arrow 98. Outlet port 96 is in communication with downstream passageway 18 and the filtered oil is then returned to the system via the downstream passageway 18. Under normal circumstances oil does not enter passageway 94 and there is no flow through bypass filter 90.

In the preferred embodiment of FIG. 4, the fluid to be filtered enters a port 100 and passes downwardly through passages to the exterior of a filter element 101. The fluid passes through the filter element and exits through a passageway 102 in the filter head and an exterior port 104. A wall 105 separates the inlet port 100 from the outlet port 104, and a passage 106 is provided in wall 105. Mounted in passage 106 is a pressure relief valve assembly comprising a mounting spider 107 which holds an axial pin 108. Mounted for axial movement on the pin 108 is a valve closure member 109 biased by a spring 110. Under normal conditions, the passage 106 is closed by the spring biased closure member 109. If the filter 101 becomes clogged, the pressure will increase in inlet port 100 thereby moving the closure member 109 along the pin 108 against the bias of spring 110 to an open position, not shown. This permits unfiltered fluid to bypass the filter 101 and flow directly out the outlet port 104.

Formed integrally within filter head 99 but at a separate location is a pressure isolation valve comprising an elongated, generally cylindrical chamber or channel 134 having a closed end 134a and an open end which is closed by a plug 142. A piston member 148, which has a cross-sectional dimension similar to that of channel 134 is mounted therein for sliding movement between a closed position shown in FIGS. 4 and 5, and an open position shown in FIG. 6. Piston member 148 has an internal bore 154 and mounted therein between piston 148 and plug 142 is a spring 164. The closed end of piston 148 has a face 157 positioned against an inlet 172 which is connected to inlet passageway 100 by means of a channel 100a. As best shown in FIG. 6, the diameter of inlet 172 is slightly smaller than the diameter of chamber 134 to provide an annular valve seat 176 engagable by the peripheral end of piston 148 surrounding face 157.

Fluid pressure from outlet 104 is provided to the interior of chamber 134 and the interior of piston 148 by means of a channel 104a formed in head 99 therebetween. Thus, under normal operating circumstances, as shown in FIGS. 4 and 5, inlet pressure is applied to face 157 while outlet pressure is applied to an opposite interior face 156 of the closed end of hollow piston 148. Because the pressures are substantially equal, spring 164 holds piston 148 in the closed position.

As shown in FIGS. 5 and 6, head 99 also has a signal port 178 extending between chamber 134 and the outside of the unit. Signal port 178 can be connected to a pressure-sensitive signal device, not shown. When, because of a dirty or clogged filter 101, the inlet pressure in chamber 172 exceeds the outlet pressure in chamber 134 plus the pressure applied by spring 164, piston 148 is forced to move in the direction of plug 142 to an open position shown in FIG. 6 which uncovers port 178 and permits inlet fluid from chamber 172 to enter port 178 thereby initiating a signal to indicate that the filter needs to be replaced.

Also formed in head 99 is a fluid exhaust port 186 which extends between chamber 134 and the exterior of the head. The outer periphery of piston 148 adjacent the closed end is provided with an elongated, annular reduced diameter portion which forms an annular recess 184 between piston 148 and the wall of chamber 134. Annular recess 184 is positioned so that it is open to exhaust port 186 during all movements of piston 148. Because a perfect seal cannot be achieved between piston 148 and the wall of chamber 134, some leakage will occur and this fluid is permitted to flow out of the unit through exhaust port 186. It is noted that signal port 178 is also positioned so that in the closed position of piston 148 it is located adjacent annular chamber 184 ensuring that signal port 178 is exposed to atmospheric pressure during the time that the piston is closed. As a result, pressure cannot build up in signal port 178 during normal usage of the filter assembly. However, when the piston moves to the open position shown in FIG. 6, signal port 178 is immediately exposed to full inlet fluid pressure to provide an immediate and accurate indication that the filter element needs to be changed.

The present disclosure has provided numerous characteristics and advantages of the present invention together with details of structure and function. It is to be understood, however, that the disclosure is illustrative only, and any changes made, especially in matters of shape, size and arrangement, to the full extent extended by the general meaning of the terms in which the appended claims are expressed, are understood to be within the principle of this invention.

What is claimed is:

1. A filter head for receiving a filter and mounting to an end of a spin-on type filter having a central fluid outlet and fluid inlet extending circumferentially around the central fluid outlet, the filter head including a pressure isolation valve for emitting a pressure signal when the pressure differential across the filter head reaches a predetermined value, comprising:

a filter head;

means for mounting the spin-on type filter to the filter head housing;

an upstream fluid passageway connecting the filter head housing with the filter circumferential fluid inlet and communicating to a source of unfiltered fluid;

a downstream fluid passageway connecting the filter head with the filter central fluid outlet and communicating with an outlet for filtered fluid;

means for sensing the difference in pressure between the fluid in the upstream and downstream fluid passageways, wherein the sensing means includes a cylindrical piston slidably mounted in a cylindrical chamber formed in the filter head, said chamber having a first fluid inlet formed therein at one end thereof fluidly open to the upstream passageway and a second fluid inlet formed in a sidewall thereof fluidly communicating to the downstream passageway, the piston having first and second faces fluidly communicating with the upstream and downstream passageways through the first and second fluid inlets, respectively, wherein the piston includes a cylindrical Wall, Said piston having a recessed portion formed in the cylindrical wall extending annularly around the piston and defining an annular chamber with said chamber, and biasing means for exerting a force of a predetermined value on the piston and biasing the piston against fluid pressure in the upstream passageway;

a signal channel opening to a first signal aperture formed in the sidewall of said chamber axially between said first and second fluid inlets for fluidly connecting the upstream fluid passageway with the chamber;

a signal outlet port opening to a second signal aperture formed in the sidewall of said chamber axially between said first and second fluid inlets for fluidly connecting the chamber to a pressure switch;

wherein the cylindrical wall of said piston includes a cylindrical un-recessed portion that is configured and arranged to sealably cover said first and second signal apertures to substantially prevent flow through said first and second apertures when said piston is in a closed position;

wherein said recess is configured and arranged to be adjacent said first and second signal apertures to permit flow from said first signal aperture to said second signal aperture via said recess when said piston is in an open position;

wherein the biasing means moves the piston to said closed position when the sensing means senses a difference between the pressures in the upstream and downstream passageways that is less than the predetermined value; and, wherein fluid pressure from the upstream passageway moves the piston to said open position wherein when the sensing means senses a difference between the pressures in the upstream and downstream passageways that equals or exceeds the predetermined value.

2. A filter head according to claim 1, further comprising means for mounting a bypass filter to said filter head, said means for mounting includes a bypass opening in the sidewall of said chamber positioned axially between said first fluid inlet and said first and second signal apertures, a first bypass channel for fluidly connecting said bypass opening to an inlet of said bypass filter, and a second bypass channel for fluidly connecting an outlet of said bypass filter to said downstream fluid passageway, wherein said piston is movable to a bypass position such that the first face of said filter uncovers said bypass opening to provide fluid communication between the first fluid inlet and said bypass opening.

* * * * *

UNITED STATES PATENT AND TRADEMARK OFFICE
CERTIFICATE OF CORRECTION

PATENT NO. : 5,501,791

DATED : March 26, 1996

INVENTOR(S) : Theisen et al.

It is certified that error appears in the above-identified patent and that said Letters Patent is hereby corrected as shown below:

Column 8, line 9, delete "Wall,Said" and insert --wall, said--.

Signed and Sealed this

Sixteenth Day of July, 1996

Attest:

BRUCE LEHMAN

Attesting Officer

Commissioner of Patents and Trademarks